May 13, 1952  R. K. MUELLER  2,596,712
ELECTROMAGNETIC APPARATUS
Original Filed March 7, 1946

Inventor
Robert K. Mueller
By Kenway Jenney Witter
& Hildreth
Attys.

Patented May 13, 1952

2,596,712

UNITED STATES PATENT OFFICE 2,596,712

ELECTROMAGNETIC APPARATUS

Robert K. Mueller, Newton, Mass., assignor, by mesne assignments, to Research Corporation, New York, N. Y., a corporation of New York Original application March 7, 1946, Serial No. 652,523. Divided and this application August 5, 1949, Serial No. 108,752

2 Claims. (Cl. 172—36)

The present invention relates to electromagnetic apparatus, and more particularly to torque motors and related devices. This application is a division of my co-pending application No. 652,523, dated March 7, 1946, now Patent No. 2,488,734, dated November 22, 1949.

In general, any motor can be classed as a torque motor, but the term is usually applied to a motor which is not continuously rotatable and in particular cases is capable of movement through only a relatively small angle. Such motors are useful in servomechanisms and in other applications requiring a precisely determined torque dependent on an electrical input.

One of the objects of the present invention is to provide a form of motor in which the generated torque or force is substantially proportional to the displacement of a movable element from a neutral position. Devices of this type are of importance as electrical equivalents of mechanical springs, and may be termed "stiffness motors." They have the advantage that the "spring constant" may be made practically uniform over the working range, and the further advantage that the constant may be easily adjusted by electrical means.

Figure 1:
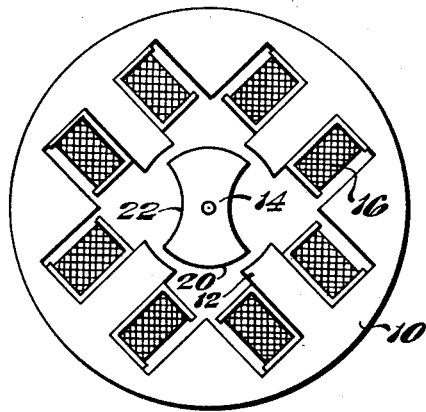
Figure 2:
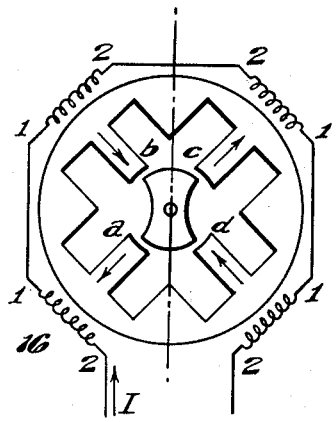
Figure 3:
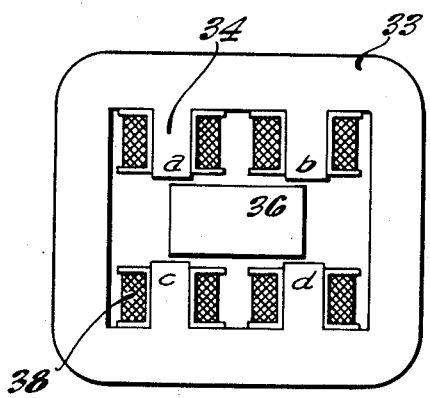
Figure 4:
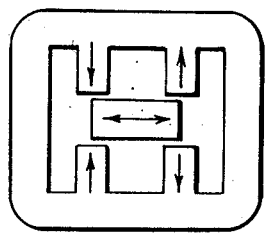

In the accompanying drawings, Fig. 1 is an elevation of the preferred form of rotary stiffness motor according to the present invention; Fig. 2 is a diagram of the magnetomotive force pattern of the apparatus shown in Fig. 1; Fig. 3 is an elevation of a modified form of motor according to the present invention; and Fig. 4 is a diagram of the magnetomotive force pattern of the apparatus of Fig. 3.

The device shown in Fig. 1 comprises a stator 10, preferably constructed of laminations of magnetic material. The stator is circular and has four re-entrant poles 12. A rotor 14 is pivoted or journaled in suitable bearings about an axis at the center of the stator frame. Each pole 12 is provided with a winding 16.

The rotor is of magnetic material, such as soft iron, and is not magnetized; nor does it carry any windings. It has circular end portions 20, each spanning the distance between centers of two adjacent poles. The pole faces are formed to provide an accurately uniform air gap with relation to the ends of the rotor. The sides 22 of the rotor are not of critical shape and are conveniently formed as circular arcs tangent to the radii drawn to the extreme edges of the circular end portions 20. The normal or neutral position of the rotor is with its edges at the centers of the pole faces as indicated in Fig. 1.

In Fig. 2 the four poles are designated consecutively by the letters $a$, $b$, $c$ and $d$. The coils associated with the four poles are connected in series to form a single circuit. In order to show the electrical connections, the coils are shown outside the frame, but it will be understood that they are wound on the pole pieces as shown in Fig. 1.

A convention designating the direction of the magnetomotive forces is necessary. The ends of each coil are designated 1 and 2. The convention is that when current flows in a coil from point 1 to point 2 the magnetomotive force is inward toward the rotor, and when the current flows from 2 to 1 the magnetomotive force is outward away from the rotor. Thus in Fig. 2 the magnetomotive forces are inward for poles $b$ and $d$, and outward for poles $a$ and $c$.

The current I which flows through the coils may be either direct or alternating current.

The torque produced by the stiffness motor is proportional to the displacement of the rotor from the neutral position. For an explanation of this result, reference should be made to Fig. 2. The rotor can be considered as being divided along its axis as indicated by the dot-and-dash line. No flux crosses that line and each half of the rotor may be considered separately. The flux passing through one half of the rotor crosses two air gaps in series. Upon any movement from neutral position one of the gaps is increased in area while the other is reduced. The total reluctance of the flux path is therefore varied by the movement of the rotor.

The reluctance of one gap is $$\frac{1}{a+b\theta}$$

(where $a$ and $b$ are constants and $\theta$ is the angle of displacement from neutral) and the reluctance of the other gap is $$\frac{1}{a-b\theta}$$

The total reluctance of the flux path is the sum of these expressions which is equal to $$\frac{2a}{a^2-b^2\theta^2}$$

The total magnetic energy stored in the field of the circuit is the square of the magnetomotive force divided by the total reluctance, and hence is proportional to $a^2-b^2\theta^2$. (Stated in another way, the self-inductance of the entire winding has a component which varies as the square of the displacement.) The torque, which is proportional to the derivative of the energy with respect to $\theta$, is therefore proportional to $\theta$ itself. Thus the device acts in the manner of a spring. The strength of the spring is proportional to the square of the magnetomotive force, which, in turn, is proportional to the square of the current in the winding. The strength of the spring is easily varied by a series resistor or any suitable means for varying the current. The device thus offers an opportunity for accurate spring adjustment.

The principles of the present invention may also be applied to devices in which the motion of the moving part is in translation or about an axis remote from the center of the stator. In this type of device, one form of which is shown in Fig. 3, the stator 33 is provided with four re-entrant poles 34 lettered $a$, $b$, $c$ and $d$. Poles $a$ and $b$ are at one side of the frame and are respectively opposed to poles $c$ and $d$ at the other side. Each pole has a winding 38. A rectangular movable member 36 is used in place of a rotor. This device is known as a "linear stiffness motor," since the member 36 moves sidewise instead of rotating.

As in the case of the rotary motor, the coils of the linear stiffness motor are connected in series to form a single circuit. The magnetomotive force pattern which they produce is shown in Fig. 4, with the coils omitted for convenience. The theoretical considerations involved are identical with those of the rotary device. The reluctance of the magnetic path through the two top poles involves a term dependent on the square of the displacement of the movable member. The same applies to the two bottom poles.

Various modifications of the motor described above are included in my above-mentioned patent.

Although the invention has been illustrated and described as embodied in several particular modifications it will be understood that the invention is not limited to these constructions, but may be embodied in other forms.

Having thus described the invention, I claim:

1. A dynamo transformer comprising a stator having four symmetrically disposed poles, a rotatable element of magnetic material pivoted within the stator and having faces spanning substantially the distance from center to center of adjacent poles and having a neutral axis disposed approximately half-way between the poles, the movable element being capable of limited movement from said neutral position and shaped to form air gaps between the movable element and the stator poles, whereby said movement from neutral position increases the areas of the air gaps of two opposed poles and decreases the areas of the other two air gaps, and a set of windings associated with all four poles and connected to produce a magnetomotive force pattern in which the forces are directed inwardly in one pair of opposing poles and outwardly in the other pair of opposing poles.

2. A dynamo transformer comprising a stator having four symmetrically disposed poles, a rotatable element of magnetic material pivoted within the stator and having faces spanning substantially the distance from center to center of adjacent poles and having a neutral axis disposed approximately half-way between the poles, the movable element being capable of limited movement from said neutral position and shaped to form air gaps between the movable element and the stator poles, whereby said movement from neutral position increases the areas of the air gaps of two opposed poles and decreases the areas of the other two air gaps, and a set of windings associated with all four poles and connected to produce a magnetomotive force pattern in which the forces are directed inwardly in one pair of opposing poles and outwardly in the other pair of opposing poles, the self-inductance of said windings having a component varying substantially as the square of the displacement of the movable element from the neutral position.

ROBERT K. MUELLER.

REFERENCES CITED

The following references are of record in the file of this patent:

UNITED STATES PATENTS

| Number | Name | Date |
|---|---|---|
| 1,964,265 | Markley | June 26, 1934 |

OTHER REFERENCES

A Survey of Physics for College Students, by Fredrick A. Saunders, Henry Holt and Company, New York, New York, 1930, page 406.